United States Patent
Nilsson et al.

(10) Patent No.: US 9,937,943 B2
(45) Date of Patent: Apr. 10, 2018

(54) ASSISTED PROPULSION SYSTEM, METHOD AND CHASSIS

(71) Applicant: ARJO HOSPITAL EQUIPMENT AB, Eslov (SE)

(72) Inventors: Richard Nilsson, Lund (SE); Jorgen Jonsson, Harlosa (SE)

(73) Assignee: Arjo Hospital Equipment AB (SE)

( * ) Notice: Subject to any disclaimer, the term of this patent is extended or adjusted under 35 U.S.C. 154(b) by 0 days.

(21) Appl. No.: 14/900,045

(22) PCT Filed: May 21, 2014

(86) PCT No.: PCT/EP2014/060451
§ 371 (c)(1),
(2) Date: Dec. 18, 2015

(87) PCT Pub. No.: WO2014/187864
PCT Pub. Date: Nov. 27, 2014

(65) Prior Publication Data
US 2016/0137216 A1 May 19, 2016

(30) Foreign Application Priority Data
May 21, 2013 (EP) .................................. 13168603

(51) Int. Cl.
*B62B 5/00* (2006.01)
*A61G 7/08* (2006.01)
(Continued)

(52) U.S. Cl.
CPC .............. *B62B 5/0073* (2013.01); *A61G 7/08* (2013.01); *A61G 7/1023* (2013.01);
(Continued)

(58) Field of Classification Search
CPC ............................... B62B 5/0069; B62B 5/073
See application file for complete search history.

(56) References Cited

U.S. PATENT DOCUMENTS

| 6,000,486 A | 12/1999 | Romick et al. |
| 6,752,224 B2 * | 6/2004 | Hopper .................... A61G 7/08 180/19.1 |

(Continued)

FOREIGN PATENT DOCUMENTS

| GB | 2343428 A | 5/2000 |
| WO | 2010127985 A1 | 11/2010 |
| WO | WO-2010127985 A1 * | 11/2010 ........... A61G 7/1048 |

OTHER PUBLICATIONS

International Search Report and Written Opinion in corresponding International Application No. PCT/EP2014/060451 filed May 21, 2014 (9 pages).

*Primary Examiner* — Kevin Hurley
(74) *Attorney, Agent, or Firm* — The Webb Law Firm

(57) ABSTRACT

An assisted propulsion system, method and chassis for conveying a payload along a surface are described. A plurality of wheels disposed about the chassis support it on the surface. A drive provides at least assisted propulsion to the chassis along the surface. At least a driving part of the drive is connected to the chassis via a mount having a resiliently sprung link. At least the driving part of the drive has a fixed orientation and is moveable independently of the chassis and the plurality of wheels in a direction towards the surface. The resiliently sprung link is arranged to direct at least the driving part onto the surface during provision of the assisted propulsion. A sensor is arranged to monitor acceleration of the drive and to communicate data on acceleration to a controller, which controls operation of the drive in dependence on the data received from the sensor.

14 Claims, 8 Drawing Sheets

(51) Int. Cl.
*A61G 7/10* (2006.01)
*B60L 11/18* (2006.01)
*B60L 15/20* (2006.01)
*B62B 3/00* (2006.01)

(52) U.S. Cl.
CPC ......... *A61G 7/1046* (2013.01); *A61G 7/1048* (2013.01); *B60L 11/1805* (2013.01); *B60L 15/20* (2013.01); *B62B 3/001* (2013.01); *B62B 3/008* (2013.01); *B62B 5/0026* (2013.01); *B62B 5/0069* (2013.01); *A61G 2203/10* (2013.01); *A61G 2203/36* (2013.01); *B60L 2200/24* (2013.01); *B60L 2220/50* (2013.01); *B60L 2240/12* (2013.01); *B60L 2240/14* (2013.01); *B60L 2240/423* (2013.01); *B60L 2240/662* (2013.01); *B62B 2301/25* (2013.01); *Y02T 10/641* (2013.01); *Y02T 10/645* (2013.01); *Y02T 10/7005* (2013.01); *Y02T 10/72* (2013.01); *Y02T 10/7275* (2013.01); *Y02T 10/7291* (2013.01); *Y02T 90/16* (2013.01)

(56) References Cited

U.S. PATENT DOCUMENTS

2003/0159861 A1    8/2003   Hopper et al.
2016/0309973 A1*   10/2016   Sheikh .................. A47L 11/282

* cited by examiner

ASSISTED PROPULSION SYSTEM, METHOD AND CHASSIS

This application is a U.S. National Stage Application of International Application No. PCT/EP2014/060451 filed on May 12, 2014, and which claims priority to EP 13168602.2 filed on May 21, 2013. The disclosures of the above-identified applications are incorporated herein by reference in their entirety.

FIELD OF THE INVENTION

The present invention relates to a chassis having an assisted propulsion system and to an assisted propulsion system and method that is particularly applicable for use in providing assisted propulsion in manual transport operations such as movement of payloads such as boxes, people, animals and the like.

BACKGROUND TO THE INVENTION

Payload transport systems vary greatly in size, payload capacity and complexity. Manually operated payload transport systems are generally designed to be easy to use, controllable and responsive. However, balancing these desires in a system that can convey the intended payloads in the particular environment is often challenging.

Take, for example, patient handling and transportation in healthcare environments. Manual handling of patients exposes care givers to dangerously high strains, especially in their lower backs, resulting in possible injuries. For this reason, patient handling equipment for the transfer of a patient from one location to another has been developed. These vary, for example, from wheeled beds and trolleys to mobile slings and hoists, mobility frames and similar devices. Equipment such as this is now used in the day to day work in a multitude of settings including hospitals, care homes and personal residences. Proper use of such equipment can significantly lower the risk for injury to the care giver and also of risk of slips, falls, strains and knocks to the patient.

However, the introduction of such equipment is not without its issues. It is well known for manual hospital beds and the like to be heavy, difficult to start moving or stop, difficult to direct and have "minds of their own", despite the best efforts of its operator pushing in the desired direction. Additionally, equipment that may be useful in a hospital environment may not be suitable for use in a residential environment, for example, meaning that different equipment may be needed in different environments despite being used for the same or similar purpose.

Powered or power assisted propulsion systems have been developed, both in the form of systems built-in to the chassis of the equipment, for example a bed frame, stretcher, hoist or the like and as devices to be added to an existing chassis. While generally helpful, such systems often do not provide propulsion in all directions that the chassis can be moved in. As a result, the propulsion system must be deactivated if the chassis is to be moved in the direction that is not covered by the propulsion system (for example, sideways).

A number of power assisted propulsion systems have been introduced to address this issue. However, it is often the case that the operator (the care giver or other person driving the chassis) still needs to drive the chassis from a certain position due to the fixed position of the user interface for operating the power assisted propulsion system.

STATEMENT OF THE INVENTION

According to an aspect of the present invention, there is provided a method of providing propulsion via a drive to a wheeled chassis along a surface comprising:
  monitoring operation of the drive;
  determining one or more properties of the surface from the operation of the drive;
  controlling operation of the drive in dependence on said determined one or more properties.

The step of monitoring operation may include monitoring acceleration of at least a part of the drive as it passes over the surface.

The method may further comprise:
  accessing a data repository encoding a plurality of surface type signatures, each surface type signature including data on acceleration of a drive when operating on said surface type;
  classifying the acceleration in dependence on said surface type signatures; and, identifying said one or more operating parameters associated with the surface type signature classification for the step of controlling operation.

The drive may include an element that moves across the surface as the chassis is propelled along the surface, the element causing a change in said acceleration of at least a part of the drive in dependence on hardness properties of the surface, the method further comprising:
  determining the acceleration caused by the element and to determine hardness properties of the surface in dependence on the determined acceleration caused by the element.

The method may further comprise sampling an accelerometer at a sampling frequency to determine said acceleration.

The method may further comprise averaging the acceleration with a moving average of power applied to the drive and correlating a detected amplitude against a data repository having predetermined amplitude ranges each corresponding to a surface type signature.

The method further comprise:
  monitoring one or more properties selected from a set including the angular velocity of the drive; applied power to a motor of the drive at the moment of measurement, load of the chassis; angle of incline of the chassis; angle of decline of the chassis; and ambient temperature; and,
  determining one or more properties of the surface from said monitored properties.

According to another aspect of the present invention, there is provided a chassis for conveying a payload along a surface comprising:
  a plurality of wheels disposed about the chassis for supporting the chassis on the surface;
  a drive arranged to provide at least assisted propulsion to the chassis along the surface,
  a sensor arranged to monitor operation of the drive; and
  a controller arranged to determine one or more properties of the surface from data from the sensor on operation of the drive and to control operation of the drive in dependence on said determined one or more properties.

The drive may include a driving part, at least the driving part of the drive being connected to the chassis via a mount having a resiliently sprung link, at least the driving part of the drive having a fixed orientation and being moveable independently of the chassis and the plurality of wheels in a direction towards the surface, the resiliently sprung link being arranged to direct the at least the driving part of the drive onto the surface during provision of said assisted propulsion.

The drive may include an element that moves across the surface as the driving part propels the chassis along the surface and causes a change in said acceleration of the drive in dependence on hardness properties of the surface, the sensor being arranged to monitor operation of the element, the processor being further configured to execute computer program code to determine the acceleration caused by the element and to determine hardness properties of the surface in dependence on the determined acceleration caused by the element.

The drive may include an element that is separate to the driving part and moves across the surface as the driving part propels the chassis along the surface, the element undergoing a change in acceleration in dependence on hardness properties of the surface, the sensor being arranged to monitor operation of the element, the processor being further configured to execute computer program code to determine the acceleration caused by the element and to determine hardness properties of the surface in dependence on the determined acceleration of the element.

The controller may include a processor configured to execute computer program code to determine one or more properties of the surface in dependence on the data on said acceleration, the controller being arranged to control operation of the drive in dependence on the properties of the surface.

The chassis may further comprise a data repository encoding a plurality of surface type signatures, each surface type signature including data on acceleration with respect to said surface type.

Each surface type signature may be associated in the data repository with one or more operating parameters for the controller, wherein the processor is configured to execute computer program code to access the data repository and classify the data on said acceleration received from said sensor in dependence on said surface type signatures and identify said one or more operating parameters for the controller associated with the surface type signature classification, the processor being further configured to execute computer program code to communicate said one or more operating parameters to the controller to control operation of the drive.

The element may comprise a non-uniformity which results in a change in acceleration as the element passes over the surface as the driving part propels the chassis along the surface.

The driving part may comprise a plurality of said elements.

The sensor may include one or more of an accelerometer, a MEMS accelerometer, a strain gauge element, an optical sensor, an electrical sensor, a system monitoring a motor powering the multi-directional drive, and a displacement detector.

The controller may be arranged to receive a control input from an operator of the chassis and is arranged to control operation of the drive in dependence on the control input and on the data received from the sensor.

The controller may be arranged to determine a change to the velocity and/or acceleration of the drive from the control input and is arranged to determine a magnitude of said change in dependence on the control input and the data received from the sensor.

The chassis may comprise a pair of the drives, the pair of drives being spaced apart from each other in a plane substantially parallel to the surface and being independent of each other.

The mount may be arranged to transmit forces from the driving part to the chassis in all directions except substantially towards or away from the surface, the resiliently sprung link being arranged to apply a damping effect to forces from the driving part in said direction substantially towards or away from the surface.

The resiliently sprung link may comprise one or more of a gas spring, a compression spring, a tension spring, an actively controlled pressure compressed air cylinder.

According to another aspect of the present invention, there is provided a patient handling equipment incorporating the chassis as described above.

The patient handling equipment may comprise a selected one of a wheeled bed, a trolley, a mobile sling lift, a hoist, a mobility frame, a sit-to-stand device, a passive patient lifter, an active patient lifter or a hygiene chair.

According to another aspect of the present invention, there is provided an assisted propulsion system for a wheeled chassis that is moveable along a surface, the assisted propulsion system comprising:

a drive coupleable to the chassis via a mount and arranged to provide assisted propulsion to the chassis along the surface, the mount substantially decoupling at least a driving part of the drive from the chassis in a direction substantially perpendicular to the surface and being arranged to apply a resilient spring force to direct at least the driving part of the drive onto the surface during provision of said assisted propulsion;

a controller arranged to control operation of the drive; and, a sensor arranged to monitor acceleration of at least a part the drive and to communicate data on said acceleration to the controller, wherein the controller is arranged to control operation of the drive in dependence on the data received from the sensor.

The controller may include a processor configured to execute computer program code to determine one or more properties of the surface in dependence on the data on said acceleration, the controller being arranged to control operation of the drive in dependence on the properties of the surface.

The assisted propulsion system may further comprise a data repository encoding a plurality of surface type signatures, each surface type signature including data on acceleration of a drive when operating on said surface type.

Each surface type signature may be associated in the data repository with one or more operating parameters for the controller, wherein the processor is configured to execute computer program code to access the data repository and classify the data on said acceleration received from said sensor in dependence on said surface type signatures and identify said one or more operating parameters for the controller associated with the surface type signature classification, the processor being further configured to execute computer program code to communicate said one or more operating parameters to the controller to control operation of the drive.

The driving part may include an element that moves across the surface as the driving part propels the chassis along the surface and causes a change in said acceleration of the drive in dependence on hardness properties of the surface, the processor being further configured to execute computer program code to determine the acceleration caused by the element and to determine hardness properties of the surface in dependence on the determined acceleration caused by the element.

The drive may include an element that is separate to the driving part that moves across the surface as the driving part propels the chassis along the surface, the element undergoing a change in acceleration in dependence on hardness properties of the surface, the sensor being arranged to monitor operation of the element, the processor being further configured to execute computer program code to determine the acceleration caused by the element and to determine hardness properties of the surface in dependence on the determined acceleration of the element.

The element may comprise a non-uniformity which passes over the surface as the driving part propels the chassis along the surface.

The assisted propulsion system may comprise a plurality of said elements.

The sensor may include one or more of an accelerometer, a MEMS accelerometer, a strain gauge element, an optical sensor, an electrical sensor, a system monitoring a motor powering the multi-directional drive, and a displacement detector.

The controller may be arranged to receive a control input from an operator of the chassis and is arranged to control operation of the multi-directional drive in dependence on the control input and on the data received from the sensor.

The controller may be arranged to determine a change to the velocity and/or acceleration of the multi-directional drive from the control input and is arranged to determine a magnitude of said change in dependence on the control input and the data received from the sensor.

The assisted propulsion system may comprise a pair of the drives coupleable to the chassis via the mount, the driving part of each of the pair of drives being spaced apart from each other in a plane substantially parallel to the surface and being independently operable and independently decoupled from the chassis in a direction substantially perpendicular to the surface.

The driving part may be is substantially fixedly connected to the mount to transmit forces from the driving part to the mount in all directions except towards or away from the surface whereby said decoupling is configured to cause the driving part to move under the resilient spring force to substantially absorb forces directions substantially towards or away from the surface.

The mount may include a resiliently sprung link to provide the resilient spring force, the resiliently sprung link comprising one or more of a gas spring, a compression spring, a tension spring, an actively controlled pressure compressed air cylinder.

Increasingly, patient handling equipment is expected to be used on a wide variety of flooring, ranging from very soft to very hard. When patient handling equipment is used on a very soft flooring with a patient suspended in the equipment, the operator, (such as a care giver), will sense that it takes much more power to move the equipment over the flooring compared to moving it over a very hard flooring.

In embodiments of the present invention, the assisted propulsion system is arranged to sense and take the flooring properties into account to work consistently in different environments such as between very soft flooring and very hard flooring. Advantageously, offering a consistent experience to the operator is not only more pleasant for the operator, it also means that the equipment is safer to convey and more predictable to control (as the operator does not need to account of flooring type when determining how hard to push, for example).

One way to give a chassis an omni-directional drive is to use a wheel type called a Mecanum wheel, as disclosed in U.S. Pat. No. 4,598,782. A Mecanum wheel is a conventional wheel with a series of rollers attached to its circumference. These rollers typically have an axis of rotation at 45° to the plane of the wheel in a plane parallel to the axis of rotation of the wheel. The axis of rotation of the rollers is inclined with respect to the rotational 'plane' of the wheel, in a plane parallel to the axis of rotation (of the wheel). Omni-directional motion of Mecanum wheeled vehicles is achieved by appropriately controlling the angular velocities of each wheel, as well as the direction of rotation.

When four Mecanum wheels are arranged in a particular pattern, they form a platform with 3 degrees of freedom, being able to move in all directions of a plane and rotate in the same plane. WO 2006/062905 describes such a platform. If all wheels are turned in the same direction, at equal angular velocity, forward/backward motion of the vehicle is achieved. By rotating the wheels on the same side against each other, a sideways motion of the vehicle is achieved. There are velocity/rotation combinations resulting, for example, only in rotation, diagonal movement of the vehicle etc.

When using Mecanum wheels for giving omni directional properties to a platform it is common practice to use a set of four wheels distributed in the four corners of a chassis. In contrast, preferred embodiments of the present invention include only two Mecanum wheels and thus advantageously reduce the cost and complexity of the power assisted propulsion system. The reduction of number of Mecanum wheels used from the typical four to two has a direct impact, reducing the cost and complexity of such a system and meaning that power assisted propulsion systems become economically viable for more uses/equipment types.

One problem with Mecanum wheels is that they aren't perfectly circular and the payload (patient) handled by the equipment will experience these irregularities in the wheel circumference as a 'bumpy ride' when being moved by Mecanum wheeled equipment.

In one embodiment of the present invention, a system is provided in which a payload is transported on or in a chassis is supported by wheels of the chassis such as castors. A drive that is preferably independent of the wheels is provided to propel the chassis in one or more of multiple directions at any one time, such as using one or more powered Mecanum wheels. The drive is decoupled from the payload of the chassis. Advantageously, such a system benefits from the multi directional drive capabilities of the Mecanum wheel whilst avoiding exposing the payload to the 'bumpy' ride inherent in systems that use Mecanum wheels.

BRIEF DESCRIPTION OF THE DRAWINGS

Embodiments of the present invention will now be described by way of example only with reference to the accompanying drawings, in which.

DETAILED DESCRIPTION

Figure 1:
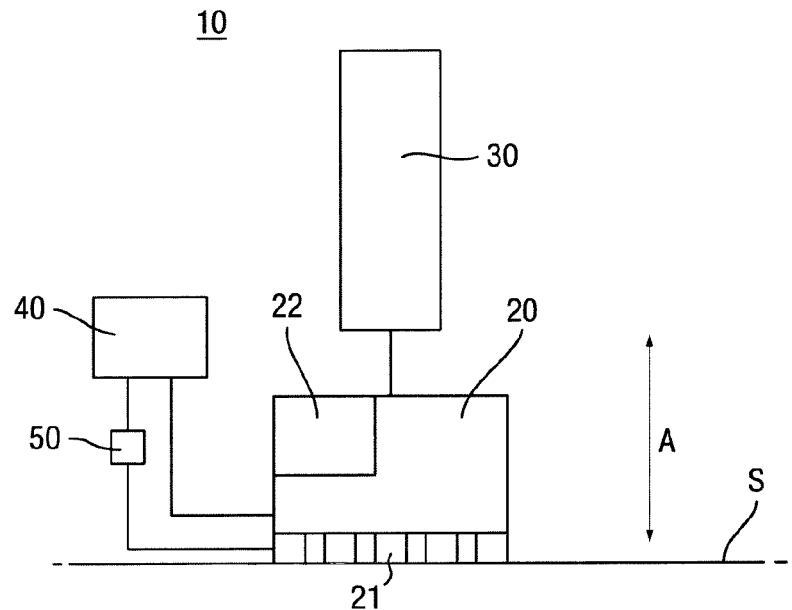
FIG. 1 is a schematic diagram of an assisted propulsion system for a chassis according to an embodiment of the present invention.

FIG. 1 is a schematic diagram of an assisted propulsion system for a wheeled chassis according to an embodiment of the present invention.

The assisted propulsion system 10 includes a drive 20 coupleable to a chassis via a mount 30 as shown in FIGS. 2 and 3a-3c. The assisted propulsion system 10 is arranged to provide assisted propulsion to the chassis along the surface S.

The mount 30 substantially decouples at least a driving part 21 of the drive from the chassis in a direction A substantially perpendicular to the surface S and is arranged to apply a resilient spring force to direct at least the driving part 21 of the drive onto the surface S during provision of said assisted propulsion.

The assisted propulsion system includes a controller 40 arranged to control operation of the drive, the drive being preferably free to move under external forces when not under control of the controller (so it can be manually pushed and will not substantially resist, for example). The assisted propulsion system also includes a sensor 50 arranged to monitor acceleration of the drive and to communicate data on said acceleration to the controller 40. The drive 20 may include one or more motors 22 for propelling the driving part along the surface S or it may be connected by a drive linkage to a motor.

Preferably, the controller is arranged to control operation of the motor(s) of the drive in dependence on the data received from the sensor. In one embodiment, the controller operates in a type of feedback loop.

Optionally, in addition to sensing surface properties, the sensor may detect acceleration of the drive from external manual forces (such as those applied to the chassis) and provide corresponding assisted propulsion from the drive. For example, if the chassis was being pushed from a stationary position, the controller would provide assisted propulsion in the same directions (or components of propulsion in whichever directions the drive can provide in order to be equivalent to propulsion in that direction). Where the chassis is already moving and the external force is attempting to slow the chassis, a braking force may be provided by slowing the propulsion and/or applying propulsion in an opposite direction. Similar arrangements apply to rotation and changes in direction of travel.

Preferably, the controller operates using principles set out in WO 2010/127985 A1, the contents of which are herein incorporated by reference. The disclosed power assisted propulsion system can receive a control input from the operator from any point around a chassis and produce a corresponding drive to propel the chassis. A control input is applied by pushing or pulling the chassis in the desired direction.

Although a single drive 20 is illustrated, preferred embodiments of the present invention utilize a pair of drives that are independently decoupled from the chassis (and may have separate or a common mount). Such an arrangement seeks to provide an assisted propulsion system for applications such as use with patient handling equipment, providing the ability to be maneuvered under assisted propulsion along a surface. When used in combination with the control system and user interface described in WO 2010/127985 A1, embodiments of the present invention provide substantial advantages over patient handling systems available today in terms of cost saving, usability, controllability, and ride provided to the patient.

Preferred embodiments of the present invention enable surface properties such as the flooring over which the equipment is being propelled to be taken into account as described in detail below. This gives the substantial advantages over existing power assisting propelling systems for patient handling equipment, especially for types where propulsion power control relies on the rotational speed of the driving wheels as described in WO 2010/127985 A1.

The drive may be provided by fixed-orientation powered wheels (either single wheels or pairs of wheels that are coupled to a common axle), rollers or the like or it may be provided by multi-directional or omni-directional drives. In one embodiment, the drive includes a number of Mecanum wheels that are capable of being powered by the motor but can also move freely in response to external forces acting on the chassis.

Figure 2:
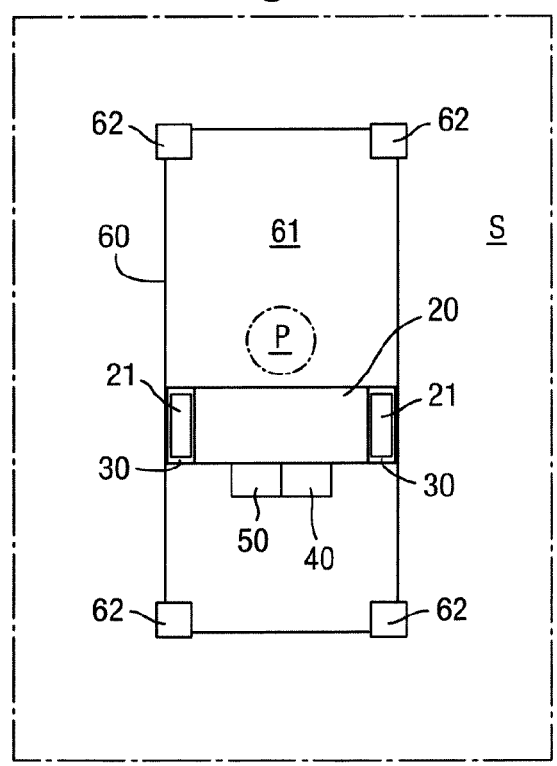
FIG. 2 is a schematic diagram of a chassis including an assisted propulsion system according to an embodiment of the present invention.

FIG. 2 is a schematic diagram of a chassis including an assisted propulsion system according to an embodiment of the present invention.

In FIG. 2, rather than the assisted propulsion system 10 being coupleable to the chassis, it is integrated with it.

The chassis 60 includes a platform 61 for conveying a payload P along a surface S. The chassis 60 includes a plurality of wheels 62 disposed about the chassis 60 for supporting the chassis 60 on the surface S. For example, the wheels may be castors, arranged to rotate so as to allow the chassis to be wheeled in different directions.

A drive 20 is arranged to provide at least assisted propulsion to the chassis 60 along the surface. At least a driving part of the drive 20 is connected to the chassis 50 via a mount 30 having a resiliently sprung link. At least the driving part of the drive 20 has a fixed orientation (such that it does not itself turn in orientation) and is moveable independently of the chassis and the plurality of wheels in a direction substantially towards or away from the surface S (i.e. substantially towards or away from the sheet in FIG. 2). The resiliently sprung link is arranged to direct at least the driving part onto the surface S during provision of the assisted propulsion (and optionally at all times).

The chassis 60 includes or is coupled to a controller 40 arranged to control operation of the multi-directional drive 20 and a sensor 50 arranged to monitor acceleration of the multi-directional drive 20 and to communicate data on the acceleration to the controller 40, the controller controlling operation of the multi-directional drive 20 in dependence on the data received from the sensor 50.

Figure 3A:
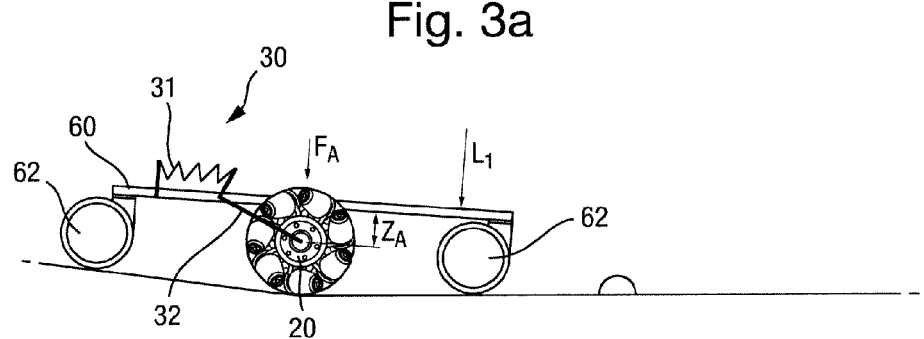
FIGS. 3a-3c are side views illustrating selected aspects of the chassis of FIG. 2 when being propelled.
Figure 3B:
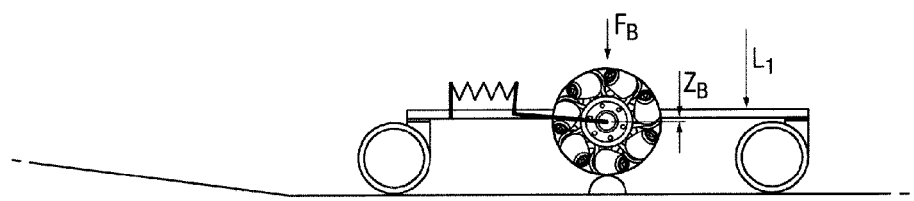
Figure 3C:
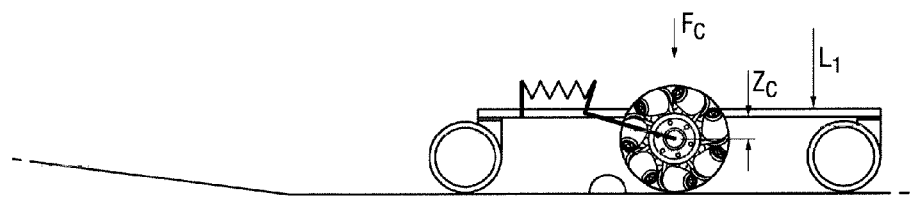

FIGS. 3a-3c are side views illustrating selected aspects of the chassis of FIG. 2 when being propelled. One drive 20 in the form of a Mecanum wheel is illustrated, although it will be appreciated that more than one drive may be used (of either Mecanum wheel type or of other type or of a mix of types).

Referring to FIG. 3a the payload P of the system is shown to be decoupled from the Mecanum wheel 20 in that it is distributed to the load bearing wheels 62, such as castors, by the preferably rigid chassis 60. The Mecanum wheel 20 is coupled to the chassis 60 by a mount 30 which includes a resiliently sprung link 31 that is preferably dominantly vertically (i.e. substantially perpendicular to the surface) moveable. The link 31 may include a swing or hinged arm 32 (or vertical sliding guide(s) or channel(s)) that provide the Mecanum wheel 20 with substantially rigid support in all directions except substantially about the vertical direction, with the surface being the horizontal reference plane.

In order to give the Mecanum wheel 20 sufficient traction to be able to provide assisted propulsion, the resiliently sprung link 4 is preferably biased so that the Mecanum wheel 20 is exposed to a predominately vertical force towards the surface. The resiliently sprung link 31 may include a resilient spring which preferably provides or contributed to the bias. The resilient spring may include a gas spring, a compression spring, a tension spring, an actively controlled pressure compressed air cylinder or other resilient spring means.

Preferably the bias should be determined or selected in dependence on the configuration of the Mecanum wheel 20 and the chassis 60. For example, the bias may be selected so as to provide a force that is selected to be able to compensate for forces FA, FB or FC, each representing different possible usage examples that may occur. For example, FA representing force needed for the Mecanum wheel 20 to have traction when having a distance ZA to the chassis 60 due to one or several of the load bearing wheel 62 going up of a slope, FB representing the force needed for the Mecanum wheel 20 to maintain traction whilst not transmitting forces to the chassis, having a distance ZB to the chassis 60 due to the Mecanum wheel 20 going over a threshold, FC representing the force needed for the Mecanum wheel 20 to have traction when having a distance ZC to the chassis 60 and is uninterrupted by any irregularities in the flooring.

The bias may be fixed or adjustable either manually or under control of the control system. It will be appreciated that instead of the illustrated Mecanum wheel, a non-multidirectional drive such as a single or pair of wheels may be used. In such an embodiment, each drive would include a wheel having two directions of propulsion (forwards/backwards in respect of each mounting orientation). A pair of drives may be used, each drive having a single or a pair of wheels.

Figure 4:
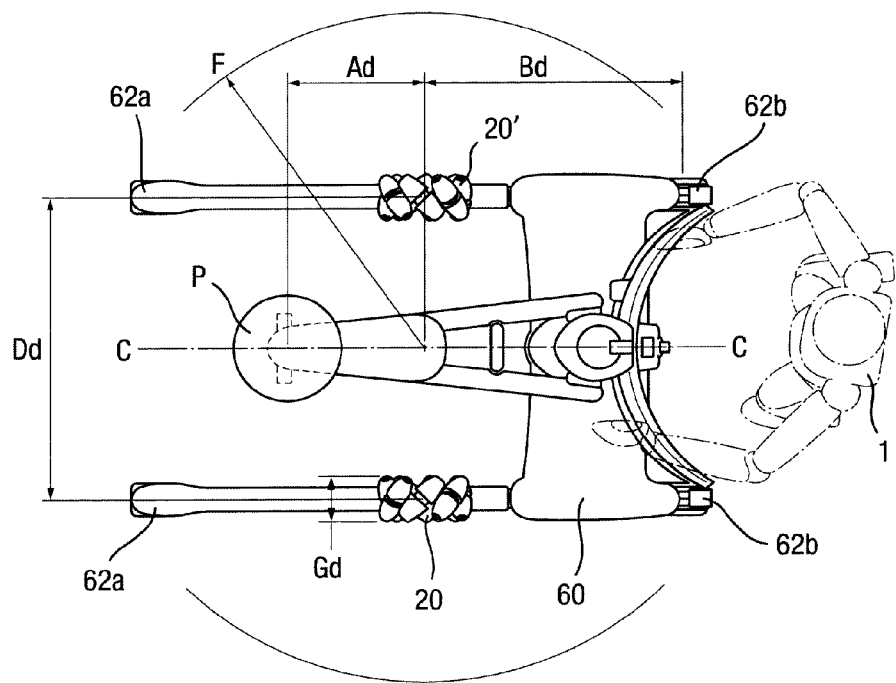
FIG. 4 is a plan view illustrating selected aspects of the chassis of FIG. 2 when under control of an operator.

FIG. 4 is a plan view illustrating selected aspects of the chassis of FIG. 2 when under control of an operator.

Referring to FIG. 4, a patient handling equipment is illustrated in the form of a mobile sling lifter. However, it will be appreciated that the principles, systems and methods of the present invention are applicable to many types of patient handling equipment including a Sit-To-Stand device, a Hygiene Chair, a wheeled bed, a trolley such as a shower trolley or a stretcher, a trolley such as a wheeled food cart, a wheeled wash basin, a wheeled linen cart, a wheeled x-ray machine, a wheeled transport chair or anything having a significant weight, a mobile sling, a hoist, a mobility frame or other forms of payload movement devices used for functions including transport of a payload such as a patient from a first point to a second point along a surface. The patient handled by the equipment can be described as the payload to be supported and transported by the equipment and the caregiver can be described as the operator of the system.

The illustrated patient handling device includes a load bearing member 60, here called chassis, and a pair of front wheels 62a and a pair of rear wheels 62b all spread apart from the payload P to give stability. Forward here being defined by the position of the front pair of wheels 62a in regards to the payload P. The operator 1 can manoeuvre the patient handling equipment from any point by simply directing it in the desired direction, for example by pushing the chassis 1 or the payload P. A pair of drives such as fixed orientation wheels or Mecanum wheels 20, 20' are coupled to the chassis via a mount for example as previously described with reference to FIGS. 1, 2 and 3a-3c. In this embodiment, the wheels 20, 20' and the wheels of the chassis 62a, 62b are free to move under the direction of the operator. However, it will be appreciated that brakes and the like may be provided to prevent accidental movement of the patient handling equipment.

Each wheel preferably has a controllable powered drive. For example, the drive may include a brushless motor, a brushless motor with a speed changing gearbox, a brushed DC motor or any other suitable electrical or electro-mechanical drive.

Forces applied by the operator to direct the patient handling equipment initiates a rotation of one or both of the wheels 20, 20'. The rotational velocity change of the motor is sensed by a control system, which controls the drive of one or both of the wheels 20, 20' to provide assisted propulsion. Preferably, the control system is arranged to provide power assisted propulsion in dependence on the forces applied by the operator such as is described in WO 2010/127985 A1, the content of which is hereby incorporated in its entirety by reference. In the case or fixed orientation wheels or non-omnidirectional wheels, the control system may be arranged to cause a reduction in power of one or more of the drives, driving of pairs of drives in opposite directions (to induce turning on the spot) or other drive arrangements such as de-coupling of the wheel(s) of the drive from the surface when the direction of assisted propulsion conflicts with the direction of the forces applied by the operator.

A preferred placement of the Mecanum wheels 20, 20' on the chassis is shown in FIG. 4 in which the Mecanum wheels 20, 20' are longitudinally placed apart from the payload P by a distance Ad and from the rear wheels 62b by a distance Bd. This preferred arrangement results in the smallest achievable overall area occupied by the patient handling equipment when turning around the centre point located between the two Mecanum wheels, illustrated by a circle with a radius E circumferencing both the two front wheels 62a and the two rear wheels 62b.

The preferred placement of the Mecanum wheels is achieved when radii F reaches its smallest possible value, although other placements and combinations such as where Ad>Bd or Bd>=Ad will result in good performance as well, merely resulting in a greater area being occupied by the patient handling equipment while turning being larger compared to the optimum placement.

In a preferred embodiment, the Mecanum wheels are symmetrically spaced apart by a distance Dd in regards to the chassis 1 centre plane C. Distance Dd is preferably greater the width Gd of the Mecanum wheels 20, 20' and preferably Dd is approximately equal to the width of the chassis 60, although it may be less than or greater than the width of the chassis 60.

Figure 5A:
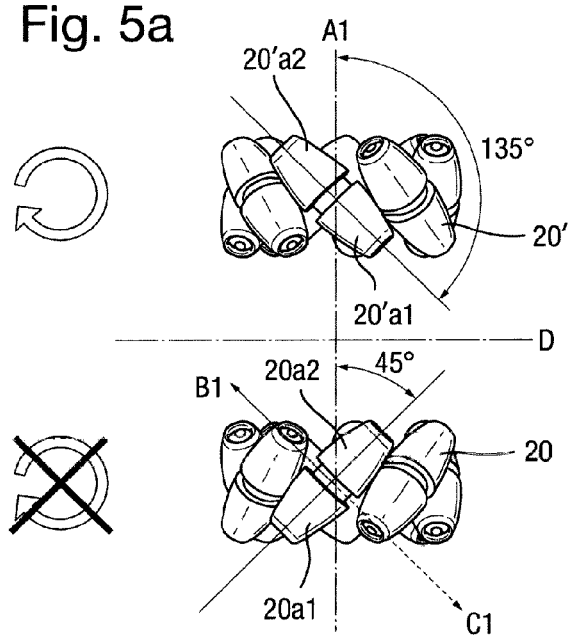
FIG. 5a is an illustration of a preferred configuration of Mecanum wheels for use in the assisted propulsion system of FIG. 1 or chassis of FIG. 2.
Figure 5B:
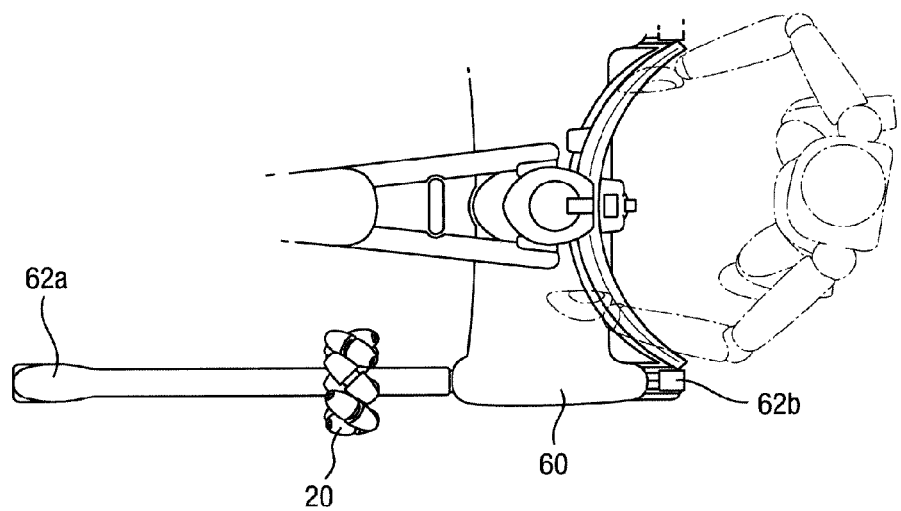
FIG. 5b is a plan view illustrating an alternate configuration of a Mecanum wheel suitable for use in embodiments of the present invention.

FIG. 5a is an illustration of a preferred configuration of Mecanum wheels for use in the assisted propulsion system of FIG. 1 or chassis of FIG. 2. FIG. 5b is a plan view illustrating an alternate configuration of a Mecanum wheel suitable for use in embodiments of the present invention.

FIG. 5a illustrates a pair of Mecanum wheels 20, 20' relative to travel directions. The relative positioning of the Mecanum wheels is not to scale and has been selected merely to show orientation of the two wheels as described below.

The Mecanum wheels 20, 20' are illustrated with direction of travel indicated as seen from a contact point of the surface (flooring). The nature of the Mecanum wheel enables it to translate movement in all directions, excluding two, in a plane into a rotational movement around the wheel axis A1, the excluded directions being perpendicular B1, C1 to the individual rollers angle with regards to the Mecanum wheel. In the embodiment of FIG. 4, the orientation of the first Mecanum wheel 20 is in a mirror inverted orientation to the second Mecanum wheel 20' (i.e. the rollers 20a1, 20a2 of the first Mecanum wheel 20 have a 45 degree angle with reference to the Mecanum wheel mid plane and the rollers 20'a1, 20'a2 of the second Mecanum wheel 20' have a 135 degree angle with reference to the Mecanum wheel mid plane). In this configuration, at least one of the Mecanum wheels 20, 20' will translate movement into rotation around the wheel axis A1. Angles other than 45 degrees and 135 degrees can achieve the same effect as long as a pair of mirror inverted Mecanum wheels are used with one Mecanum wheel having its rollers oriented in a mirror image position to the other Mecanum wheel.

FIG. 5b shows part of an alternate arrangement of that of FIG. 5a in which one of the Mecanum wheels 7A, out of the pair is shown mounted in an alternate orientation with respect to the chassis 60. As described above, angle E can be of any value between 0 and 360 degrees as long as the second Mecanum wheel of the pair (not shown) is mainly symmetrically placed in regards to the chassis 60 centre axis C. Preferably the angle E should be 0 degrees as illustrated by FIG. 5a or 90 degrees as illustrated by FIG. 5b for the arrangement to operate optimally.

Figure 6:
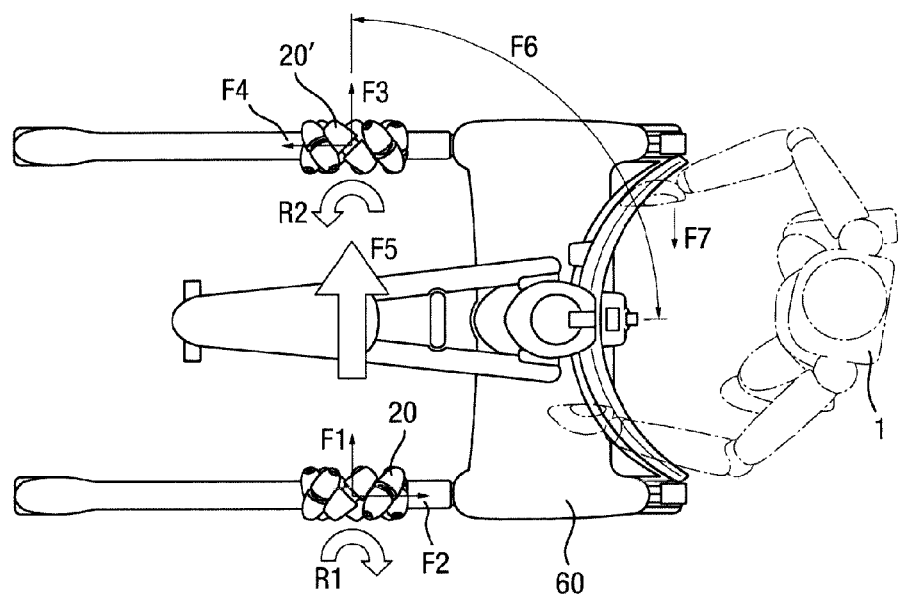
FIG. 6 is a plan view illustrating selected aspects of the chassis of FIG. 2 when under control of an operator.

FIG. 6 is a plan view illustrating selected aspects of the chassis of FIG. 2 when under control of an operator. FIG. 6 illustrates aspects of rotation and drive using two Mecanum wheels instead of the conventional four.

If the chassis 60 is to be moved sideways in a direction F5, a manual force in the intended direction is applied by the operator 1. As a result of this manual force, the Mecanum wheels are caused to rotate, resulting in one Mecanum wheel rotating clockwise (R1) while the other Mecanum wheel rotating counter clockwise (R2). As previously described, each Mecanum wheels has a drive. A change in the rotational velocity change of the respective drive's motor is sensed and reported to the control system which triggers a corresponding motorized rotation of the respective Mecanum wheel 20, 20' to provide assisted propulsion. In one embodiment, the control system is essentially as described in WO 2010/127985 A1.

Preferably, each respective Mecanum wheel 20, 20' is coupled to the chassis in all directions except substantially towards or away from the surface. As a result, this motorized rotation of the Mecanum wheels along the surface results in driving forces being transmitted to the chassis 60. It will be appreciated that these forces can be divided in forces helping to move the system in a desired direction as F1 and F3 which both helps to move the system sideways as intended by the operator 1, remaining are the forces F2 and F4 which both results in a torque force F6 trying to rotate the system, this torque force F6 is however balanced out by the operator 1 acting with a force F7 on any place on the rigid members of the chassis 60. The direction and magnitude of F7 varies by the point of contact chosen by the operator 1. The operator can use a multiple points of contact and thus divide the illustrated force F7 into several component forces each being smaller than F7. With the above described counter-acting force F7 it is possible to utilize only two Mecanum wheels instead of the commonly used four that would balance out the unwanted forces due to their geometrical arrangement.

Figure 7:
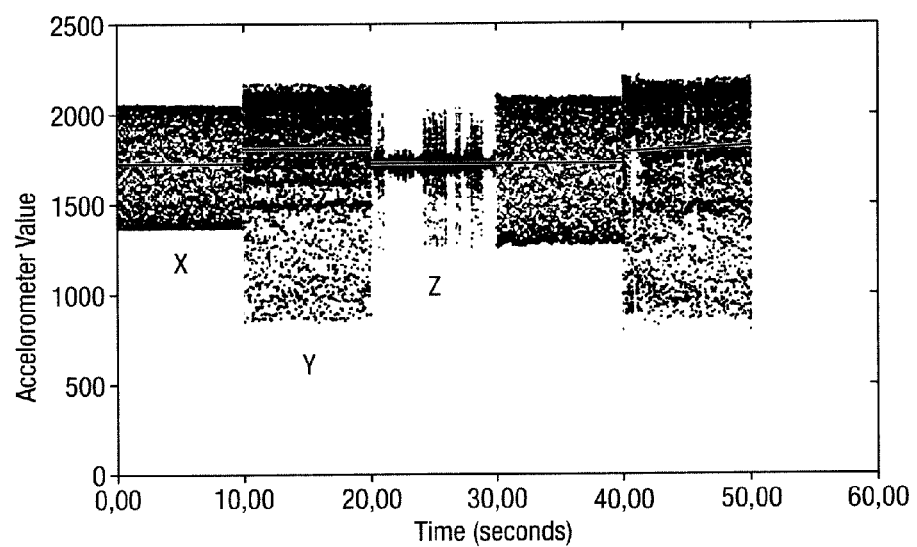
FIG. 7 is an illustration of aspects of operation of a method according to an embodiment of the present invention.
Figure 7:
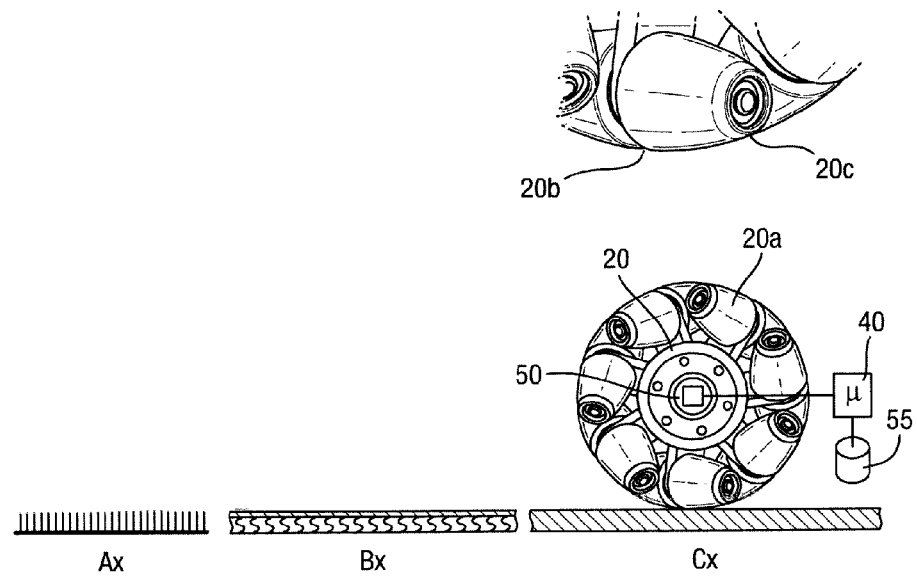

FIG. 7 is an illustration of operation of a method according to an embodiment of the present invention.

In FIG. 7, aspects of a method is illustrated that enables properties of the surface (such as flooring type, hardness) over which the chassis is being driven to be determined or derived and used.

Hardness of the surface is directly coupled to the rolling resistance as exposed to the drive. A very hard flooring Cx gives a lower rolling resistance than a very soft flooring Ax. By determining or deriving the hardness properties of the surface over which the chassis 60 is travelling, a change in rolling resistance offered by the surface (for example if the floor covering or flooring changes from one type to another) could be compensated for by the assisted propulsion system resulting in consistent driving characteristics as sensed by the operator 1.

Even if the chassis passes over several different flooring types ranging from very soft Ax, intermediate Bx, to very hard Cx, the forces on the operator would be substantially unchanged, meaning a reduced chance of strain or injury (the transition of pushing on a surface having limited resistance to one of high resistance can be a surprise and the operator may conventionally have tried to manually compensate and hurt themselves). Additionally, modifying the assisted propulsion to suit a change in surface properties avoids the operator over or under compensating.

As previously discussed, a Mecanum wheel 20 has a plurality of conical rollers 20a arranged in a way that they form a circular pattern resembling a 'normal' wheel. However good design a Mecanum wheel may have, it will always have deviations from a perfect circle because the conical rollers 20a will form gaps 20c where they are attached to the hub and where they overlap each over 20d as seen from the Mecanum wheel rotational side. These irregularities (elements) cause the Mecanum wheel to move in a vertical plane as it travels over an otherwise horizontal surface such as flat flooring—in effect, it inherently 'bumps'. Each time the Mecanum wheel 'bumps', it accelerates/decelerates vertically.

In preferred embodiments of the present invention, the acceleration of the Mecanum wheel 20 caused by the irregular elements is monitored by a sensor 50 coupled directly or indirectly to the Mecanum wheel in the form of for example, a MEMS accelerometer, a strain gauge element, an optical sensor, a displacement detector or similar.

The acceleration measurements (or data on the acceleration measurements) is communicated to the controller or an intermediate unit which has a processor executing operations from computer program code to visualize the effect of the acceleration caused by the 'bumpiness' of the Mecanum wheel 20 and determine or derive hardness properties of the surface. The properties of different surface types Ax, Bx, Cx will be reflected in the different measurements/visualized effects X,Y,Z of the acceleration. A very soft flooring Ax has a different signature X than a very hard flooring Cx's signature Z. By placing a sensor 50 coupled directly or indirectly to the Mecanum wheel 20, 20' to monitor acceleration and feed the signal from it to the controller 40, the controller 40 can determine surface properties and adjust the aspects of the assisted propulsion such as magnitude of drive in a particular direction (increase or decrease propulsion to cater for increase or decrease in surface resistance), magnitude of rotation force applied when turning (again to accommodate for changes in surface resistance) etc.

Preferably, a data repository 55 encodes data on a plurality of surface type signatures, each surface type signature including data on acceleration of a multi-directional drive when operating on said surface type. Each surface type signature may be associated in the data repository with one or more operating parameters for the controller. The controller 40 (or some intermediate unit that performs the computation and reports to the controller) includes a processor configured to execute computer program code to access the data repository and classify the data on the acceleration received from the sensor 50 in dependence on the surface type signatures and identify said one or more operating parameters for the controller associated with the surface type signature classification. The one or more operating parameters used by the controller to control operation of the multi-directional drive (such as the Mecanum wheel 20, although it will be appreciated that other drive types may be used and sensor readings from different wheels may be combined or cross-referenced to determine surface properties).

Preferably, the processor is configured to execute computer program code to determine the substantially vertical acceleration components caused by the non-uniformities in the Mecanum wheel 20 (or other drive type) as it passes over the surface and to determine hardness properties of the surface in dependence on the determined acceleration.

The controller may modify the effect of a received input (force) from an operator in dependence on the data received from the sensor. For example, while a force may be interpreted as a certain acceleration or rotation, this may be increased, decreased or even ignored based on data received from the sensor.

The accelerometer is read with a suitable interval (sampling frequency). This signal can be processed in a number of ways in order to come up with a unique signature for a given floor firmness. In its simplest form, the signal can be averaged with a 'moving average' of suitable power. The resulting amplitude can then be used on its own as an indicator of the surface firmness. In this case a table with different amplitude intervals is stored with corresponding parameters to be passed to the controller if the detected amplitude falls within a certain interval.

If necessary, the angular velocity of the driving wheel(s) may also be monitored. In such an embodiment, the previously mentioned table may have a further dimension, angular velocity interval, which is cross-referenced to determine the set of parameters to be passed to the controller.

Other parameters may also be taken into account such as applied power to the motor at the moment of measurement, load of the system (patient weight), inclined or declined angle of the whole system (going up a ramp for example) and/or ambient temperature.

In one example parameters of amplitude (A), power (B), load (C) and temperature (D) are stored. For a given resolution of A, B, C and D, the resulting number of parameter collections corresponding to a floor property to be stored would be A*B*C*D. A parameter collection can range from a single parameter to a number of parameters.

The parameter(s) is/are passed to the controller, affecting the algorithm controlling the propulsion system (for example as set out in WO 2010/127985 A1). For example, the parameters may cause a higher starting torque assistance or greater sensitivity to deceleration.

While features of Mecanum wheels lend themselves to determining properties of flooring, it will be appreciated that the method of FIG. 7 can be implemented by other arrangements where other non-Mecanum drives are used. Such examples are described below with reference to FIGS. 8 to 10.

Figure 8:
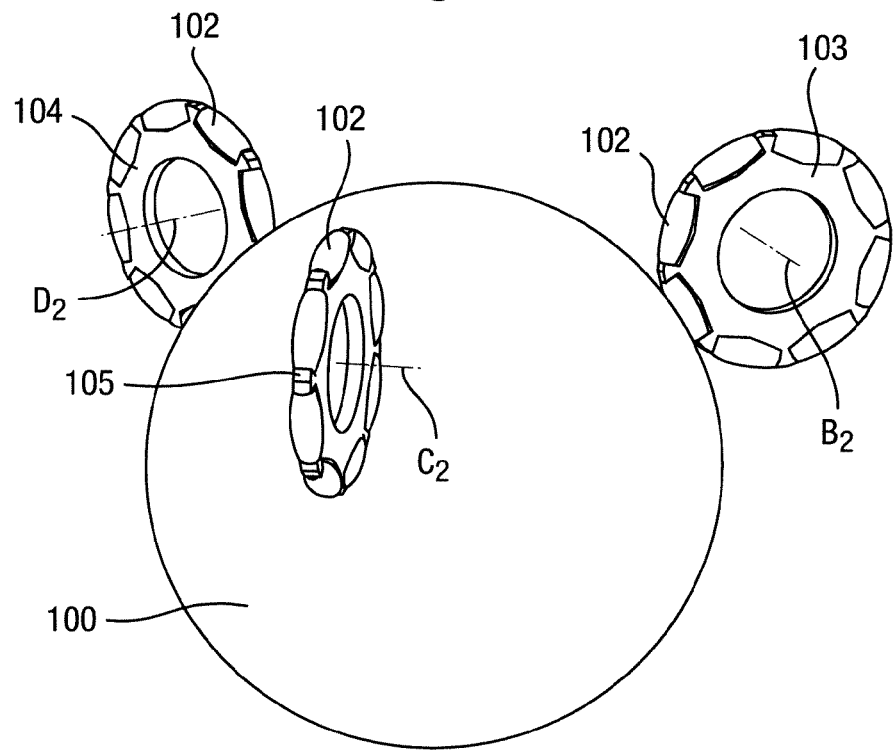
FIGS. 8 to 10 are illustrations of selected features of alternate embodiments of the present invention.
Figure 9:
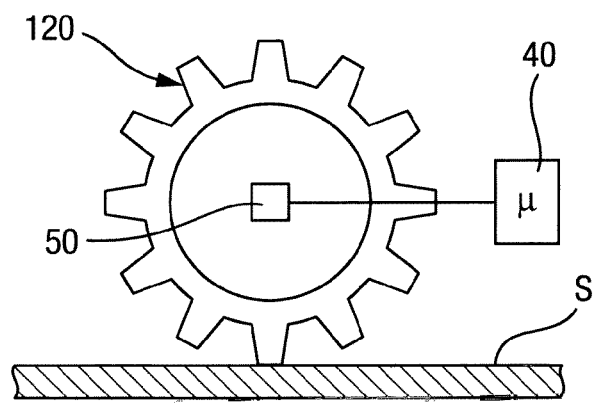
Figure 10:
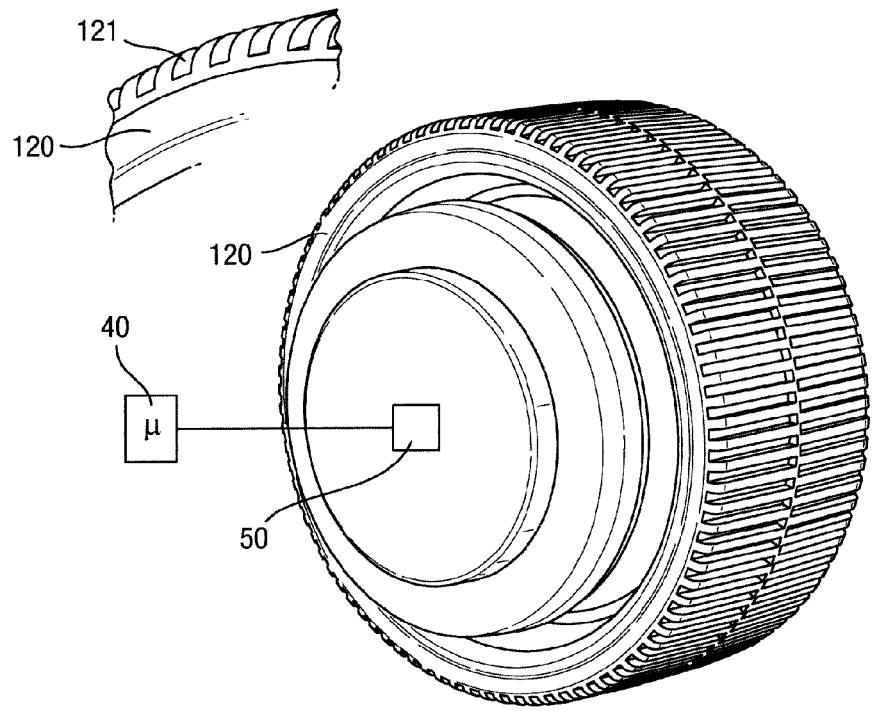

FIGS. 8 to 10 are illustrations of selected features of alternate embodiments of the present invention.

Referring to FIG. 8, an alternative drive to the previously described Mecanum wheel is shown. It will be appreciated that this drive could be substituted for any or all of the Mecanum wheels described in connection with the embodiments of FIGS. 1 to 7. The drive includes a substantially spherically shaped wheel 100 supported by a plurality of wheels 103, 104, 105, each made up of a plurality of rollers 102 free to rotate around their own axis A, each supporting wheel 103, 104, 105, rotatable around their own axis B2, C2, D2. There are preferably at least three supporting wheels 103, 104, 105. The plurality of supporting wheels 103, 104, 105, are preferably evenly longitudinally distributed around the sphere's upper hemisphere. When the sphere 100 travels in any given direction along a surface, the movement translates into a rotational movement of at least two of the supporting wheels 103, 104, 105 around their respective axis B2, C2, or D2.

At least one of the supporting wheels is monitored for rotational velocity change. Preferably, at least one of the supporting wheels contains or is linked to a drive in the form of, for example, a brushless motor, a brushless motor with a speed changing gearbox, a brushed DC motor or any other suitable electrical or electro-mechanical drive means. A rotational velocity change of the drive is preferably amplified and communicated to a controller in order to communicate movement of the wheel by manual action and initiate assisted propulsion (by powering of the supporting wheels and thereby powering the spherically shaped wheel 100). As a result, similar control and performance can be achieved compared to a system using the above described Mecanum wheels.

Other variants of the multi-directional drive can be envisaged without departing from the spirit and scope of the present invention which is defined by the appended claims. It will be appreciated that in principle, any number and positioning of single directional, multi-directional or omni-directional drives could be used. In preferred embodiments, the drives are fixed in orientation (ie. they do not change orientation or direction) and by providing assisted propulsion in one or more directions, can cause rotation, translation, movement or braking of the chassis on the surface.

FIG. 9 illustrates an alternate embodiment for determining vertical acceleration. Instead of relying on the 'bumpiness' of the Mecanum wheel, an element 120 in the form of a wheel or a sphere or other element with an irregular outer shape may be positioned to travel with the Mecanum wheel (or other drive) over the surface S. A sensor 50 is coupled directly or indirectly to the element 120 or else is arranged to directly or indirectly monitor the element 120. The sensor may include a MEMS accelerometer, a strain gauge element, an optical sensor, a displacement detector or the like. The sensor 50 operates in a similar way to the embodiments described above, monitoring acceleration of the element 120 as it travels over the surface S and feeds an output signal to the controller (which may be in the form or a processor or microprocessor executing computer program code to controlling the assisted propulsion.

As shown in FIG. 10, the irregular outer shape of the element 120 could be in the form of a tyre 121 or tyre pattern of either a freewheeling wheel or a driving wheel resulting in the same hardness discovering properties and advantages as described above The element may be in the form of a freely rotatable castor in order that the element can rotate in the same direction as the drive provided by the Mecanum or other drive it is tracking.

Figure 11:
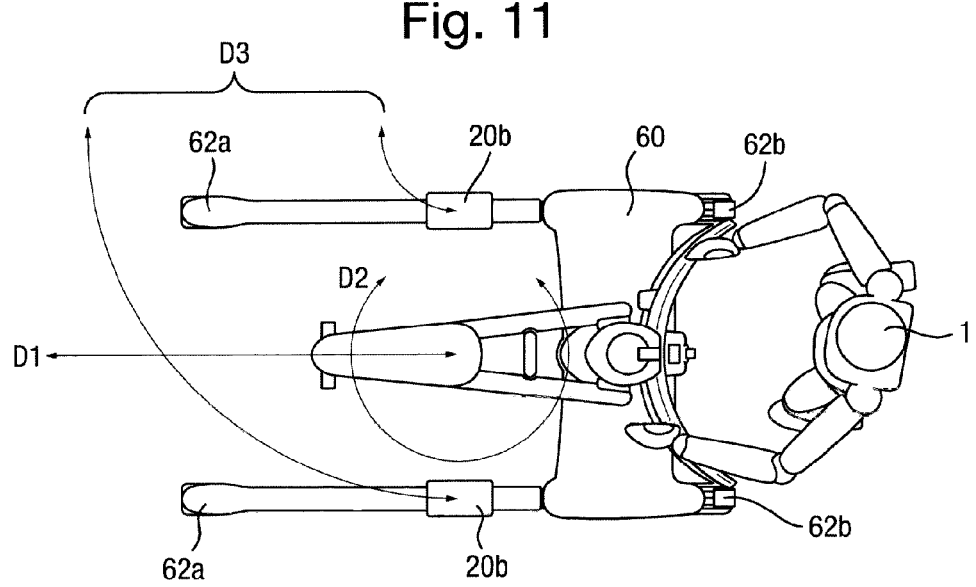
FIG. 11 is a plan view illustrating selected features of alternate embodiments of the present invention; and, FIG. 12a-c are illustrations of selected features of alternate embodiments of the present invention.

FIG. 11 is a plan view illustrating selected features of alternate embodiments of the present invention.

Although the drive has been illustrated in certain embodiments above as a Mecanum wheel, the same chassis can be propelled by other arrangements such as a pair of propelled ordinary wheels without omni-directional properties. The two propelled ordinary wheels will have lesser degrees of freedom to propel the chassis compared to the previously described multi-directional drives but nevertheless can provide useful assistance to an operator.

The two propulsion wheels 20b can propel the chassis 60 in a predominately forwards/rearward direction as illustrated by the path D1, forward being referred of as towards the front wheels 62a of the chassis 60, when being driven at the approximately same speed and direction, or rotate the chassis around an imaginary point between the two propulsion wheels 20b as illustrated by the path D2 when being driven at the approximately same speed and opposite direction is relation to each other, or propel the chassis in the a path resembling an arch as illustrated by path D3 when being driven at different speeds but in the same direction.

Figure 12A:
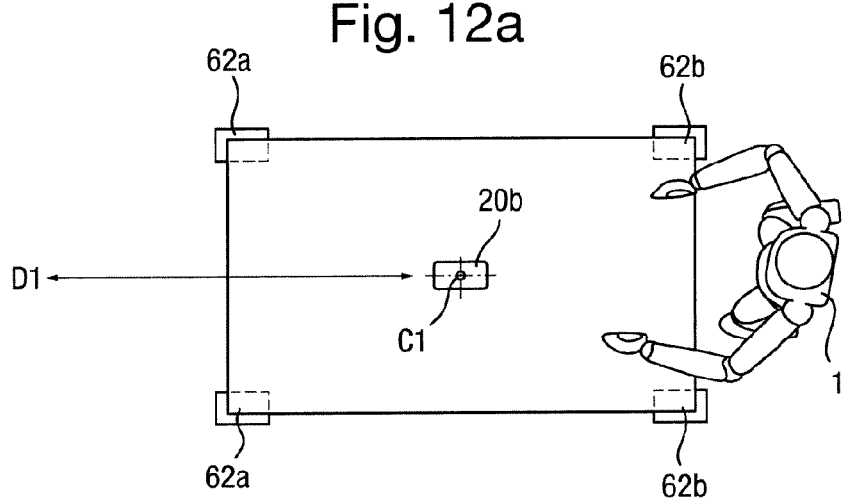
Figure 12B:
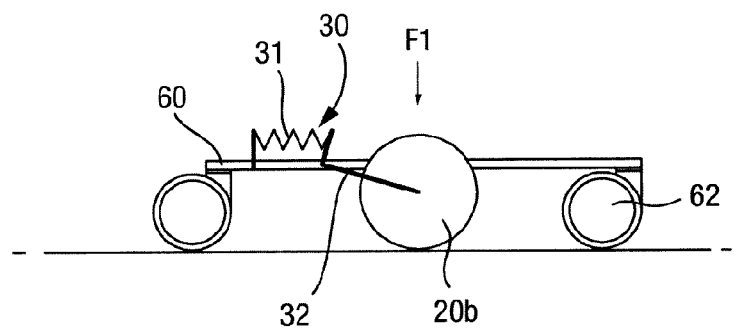
Figure 12C:
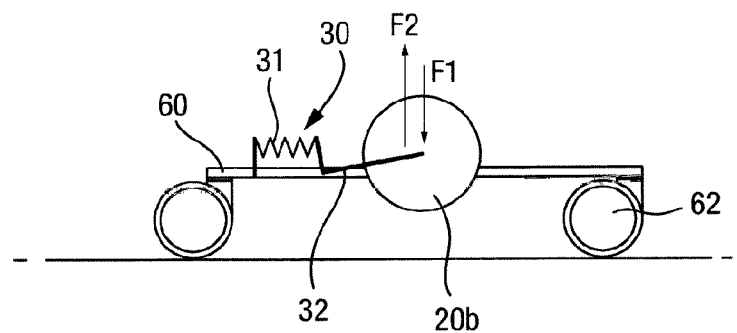

FIG. 12a-c are illustrations of selected features of alternate embodiments of the present invention.

As shown in FIG. 12a, the propulsion wheel 20b can propel the chassis 60 in a predominately forwards/rearward direction as illustrated by the path D1, forward being referred of as towards the front wheels 62a of the chassis 60.

Even if the single ordinary wheel 20b can't add propulsion to the chassis 60 to rotate it, the user 1 will benefit from the propulsion wheels 20a contact point C with the surface as this will work as an anchor point for the chassis when the user 1 wants to change direction of travel for the chassis. Instead of four vaguely defined contact points from each of the swiveling load bearing castors 62a, 62b the user 1 will be provided with one well Although the drive has been illustrated in certain embodiments above as a Mecanum wheel that may free wheel under a manual input and provide selective assisted propulsion in dependence on detection of a manual input force causing the free-wheeling, it will be appreciated that this is one of a number of different control arrangements that may be used. For example, a more traditional control arrangement may be used (for example, a control input may be applied at a console, user interface, controller or the like that applies driving force via the drive that would otherwise be static). The defined contact point C enhances the maneuverability of the chassis 60 compensating for the lack of multi-directional properties of the ordinary wheel 20b.

Referring to FIG. 12b, the payload P of the system is shown to be decoupled from the propulsion wheel 20b. The payload is distributed to the load bearing wheels 62, such as castors, by the preferably rigid chassis 60. The propulsion wheel 20b is coupled to the chassis 60 by a mount 30 which includes a resiliently sprung link 31 that is preferably dominantly vertically (i.e. substantially perpendicular to the surface) moveable. The link 31 may include a swing or hinged arm 32 (or vertical sliding guide(s) or channel(s)) that provide the propulsion wheel 20b with substantially rigid support in all directions except substantially about the vertical direction, with the surface being the horizontal reference plane.

The resiliently sprung link 31 applies a force F1 of the propulsion wheel 20b towards the surface in order for the propulsion wheel to propel the chassis 60.

Referring to FIG. 12c, in order for the chassis 60 to be maneuverable in all possible directions along the surface, the propulsion wheel 20b may be decoupled from the surface by applying a second force F2 that is of a larger magnitude than force F1.

It will also be appreciated that the force applied to the driving part via the sprung link or similar component may be controllable in dependence on the detected surface properties. For example, detection of skidding may be compensated by an increase in force applied through the sprung link, detection of displacement of the drive over a predetermined threshold may be interpreted as a potentially bumpy ride and the speed and/or force applied via the sprung link may be reduced to increase comfort to the payload.

It is to be appreciated that certain embodiments of the invention as discussed above may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

Clauses:

Clause 1. A chassis for conveying a payload along a surface comprising:

a plurality of wheels disposed about the chassis for supporting the chassis on the surface;

a multi-directional drive arranged to provide at least assisted propulsion to the chassis along the surface in any of one or more of said multi-directions, wherein at least a driving part of the multi-directional drive is connected to the chassis via a mount having a resiliently sprung link, at least the driving part of the multi-directional drive having a fixed orientation and being moveable independently of the chassis and the plurality of wheels in a direction towards the surface, the resiliently sprung link being arranged to direct the at least the driving part of the multi-directional drive onto the surface during provision of said assisted propulsion.

Clause 2. The chassis of clause 1, further comprising:
a controller arranged to control operation of the multi-directional drive; and,
a sensor arranged to monitor acceleration of the multi-directional drive and to communicate data on said acceleration to the controller,
wherein the controller is arranged to control operation of the multi-directional drive in dependence on the data received from the sensor.

Clause 3. The chassis of clause 2, wherein the controller includes a processor configured to execute computer program code to determine one or more properties of the surface in dependence on the data on said acceleration, the controller being arranged to control operation of the multi-directional drive in dependence on the properties of the surface.

Clause 4. The chassis of clause 3, further comprising a data repository encoding a plurality of surface type signatures, each surface type signature including data on acceleration of a multi-directional drive when operating on said surface type.

Clause 5. The chassis of clause 4, wherein each surface type signature is associated in the data repository with one or more operating parameters for the controller, wherein the processor is configured to execute computer program code to access the data repository and classify the data on said acceleration received from said sensor in dependence on said surface type signatures and identify said one or more operating parameters for the controller associated with the surface type signature classification, the processor being further configured to execute computer program code to communicate said one or more operating parameters to the controller to control operation of the multi-directional drive.

Clause 6. The chassis of clause 3, 4 or 5, wherein the driving part includes an element that moves across the surface as the driving part propels the chassis along the surface and causes a change in said acceleration of the multi-directional drive in dependence on hardness properties of the surface, the processor being further configured to execute computer program code to determine the acceleration caused by the element and to determine hardness properties of the surface in dependence on the determined acceleration caused by the element.

Clause 7. The chassis of clause 6, wherein the element comprises a non-uniformity in the driving part which passes over the surface as the driving part propels the chassis along the surface.

Clause 8. The chassis of clause 6 or 7, wherein the driving part comprises a plurality of said elements.

Clause 9. The chassis of any of clauses 2 to 8, wherein the sensor includes one or more of an accelerometer, a MEMS accelerometer, a strain gauge element, an optical sensor, an electrical sensor, a system monitoring a motor powering the multi-directional drive, and a displacement detector.

Clause 10. The chassis of any of clauses 2 to 8, wherein the controller is arranged to receive a control input from an operator of the chassis and is arranged to control operation of the multi-directional drive in dependence on the control input and on the data received from the sensor.

Clause 11. The chassis of clause 10, wherein the controller is arranged to determine a change to the drive direction of the multi-directional drive from the control input and is arranged to determine a magnitude of said change in dependence on the control input and the data received from the sensor.

Clause 12. The chassis of clause 10 or 11, wherein the controller is arranged to determine a change to the velocity and/or acceleration of the multi-directional drive from the control input and is arranged to determine a magnitude of said change in dependence on the control input and the data received from the sensor.

Clause 13. The chassis of any preceding clause, comprising a pair of the multi-directional drives, the pair of multi-directional drives being spaced apart from each other in a plane substantially parallel to the surface and being independent of each other.

Clause 14. The chassis of clause 13, wherein the pair of multi-directional drives are substantially equidistantly spaced apart from a longitudinal axis of the chassis.

Clause 15. The chassis of clause 14, wherein the each of the pair of multi-directional drives is positioned at substantially the perimeter of the chassis.

Clause 16. The chassis of clause 13, 14 or 15, wherein the pair of multi-directional drives are substantially equidistantly spaced apart from a centre point of the chassis.

Clause 17. The chassis of clause 13, 14, 15 or 16, wherein the pair of multi-directional drives are substantially equidistantly spaced apart from an expected centre of weight of the payload.

Clause 18. The chassis of any of clauses 13 to 17, wherein the pair of multi-directional drives are substantially symmetrically positioned with respect to the longitudinal axis of the chassis.

Clause 19. The chassis of any preceding clause, wherein the or each multi-directional drive comprises an omni-directional drive.

Clause 20. The chassis of clause 19, wherein the or each multi-directional drive comprises a Mecanum wheel.

Clause 21. The chassis of any of clauses 13 to 18, wherein each multi-directional drive comprises a Mecanum wheel having a midplane of rotation non-parallel to the longitudinal axis of the chassis.

Clause 22. The chassis of clause 21, wherein one of said multi-directional drives comprises a Mecanum wheel having a midplane of rotation at 45° to the longitudinal axis of the chassis and the other one of said multi-directional drives comprises a Mecanum wheel having a midplane of rotation at 135° to the longitudinal axis of the chassis.

Clause 23. The chassis of clause 19, wherein the or each omni-directional drive comprises:
a substantially spherical wheel arranged to contact the surface at a point substantially in a first hemisphere; and,
three or more rotatable elements disposed about a second hemisphere opposite the first hemisphere and arranged to contact the spherical wheel and rotate with the spherical wheel.

Clause 24. The chassis of any preceding clause, wherein the mount is arranged to transmit forces from the driving part to the chassis in all directions except substantially towards or away from the surface, the resiliently sprung link being arranged to apply a damping effect to forces from the driving part in said direction substantially towards or away from the surface.

Clause 25. The chassis of clause 24, wherein the resiliently sprung link comprises one or more of a gas spring, a compression spring, a tension spring, an actively controlled pressure compressed air cylinder.

Clause 26. A patient handling equipment incorporating the chassis of any preceding clause.

Clause 27. The patient handling equipment of clause 26 comprising a selected one of a wheeled bed, a trolley, a mobile sling, a hoist, a mobility frame, a sit-to-stand device or a hygiene chair.

Clause 28. An assisted propulsion system for a wheeled chassis that is moveable along a surface, the assisted propulsion system comprising:

a multi-directional drive coupleable to the chassis via a mount and arranged to provide assisted propulsion to the chassis along the surface in any of one or more of said multi-directions, wherein the mount substantially decouples at least a driving part of the multi-directional drive from the chassis in a direction substantially perpendicular to the surface and is arranged to apply a resilient spring force to direct at least the driving part of the multi-directional drive onto the surface during provision of said assisted propulsion.

Clause 29. The assisted propulsion system of clause 28, further comprising:

a controller arranged to control operation of the multi-directional drive; and, a sensor arranged to monitor acceleration of the multi-directional drive and to communicate data on said acceleration to the controller, wherein the controller is arranged to control operation of the multi-directional drive in dependence on the data received from the sensor.

Clause 30. The assisted propulsion system of clause 29, wherein the controller includes a processor configured to execute computer program code to determine one or more properties of the surface in dependence on the data on said acceleration, the controller being arranged to control operation of the multi-directional drive in dependence on the properties of the surface.

Clause 31. The assisted propulsion system of clause 30, further comprising a data repository encoding a plurality of surface type signatures, each surface type signature including data on acceleration of a multi-directional drive when operating on said surface type.

Clause 32. The assisted propulsion system of clause 32, wherein each surface type signature is associated in the data repository with one or more operating parameters for the controller, wherein the processor is configured to execute computer program code to access the data repository and classify the data on said acceleration received from said sensor in dependence on said surface type signatures and identify said one or more operating parameters for the controller associated with the surface type signature classification, the processor being further configured to execute computer program code to communicate said one or more operating parameters to the controller to control operation of the multi-directional drive.

Clause 33. The assisted propulsion system of clause 30, 31 or 32, wherein the driving part includes an element that moves across the surface as the driving part propels the chassis along the surface and causes a change in said acceleration of the multi-directional drive in dependence on hardness properties of the surface, the processor being further configured to execute computer program code to determine the acceleration caused by the element and to determine hardness properties of the surface in dependence on the determined acceleration caused by the element.

Clause 34. The assisted propulsion system of clause 33, wherein the element comprises a non-uniformity in the driving part which passes over the surface as the driving part propels the chassis along the surface.

Clause 35. The assisted propulsion system of clause 33 or 34, wherein the driving part comprises a plurality of said elements.

Clause 36. The assisted propulsion system of any of clauses 29 to 35, wherein the sensor includes one or more of an accelerometer, a MEMS accelerometer, a strain gauge element, an optical sensor, an electrical sensor, a system monitoring a motor powering the multi-directional drive, and a displacement detector.

Clause 37. The assisted propulsion system of any of clauses 29 to 36, wherein the controller is arranged to receive a control input from an operator of the chassis and is arranged to control operation of the multi-directional drive in dependence on the control input and on the data received from the sensor.

Clause 38. The assisted propulsion system of clause 37, wherein the controller is arranged to determine a change to the drive direction of the multi-directional drive from the control input and is arranged to determine a magnitude of said change in dependence on the control input and the data received from the sensor.

Clause 39. The assisted propulsion system of clause 37 or 38, wherein the controller is arranged to determine a change to the velocity and/or acceleration of the multi-directional drive from the control input and is arranged to determine a magnitude of said change in dependence on the control input and the data received from the sensor.

Clause 40. The assisted propulsion system of any clauses 28 to 39, comprising a pair of the multi-directional drives coupleable to the chassis via the mount, the driving part of each of the pair of multi-directional drives being spaced apart from each other in a plane substantially parallel to the surface and being independently operable and independently decoupled from the chassis in a direction substantially perpendicular to the surface.

Clause 41. The assisted propulsion system of clause 40, wherein the pair of multi-directional drives are substantially symmetrically positioned with respect to a centre axis of the assisted propulsion system.

Clause 42. The assisted propulsion system of any of clauses 28 to 41, wherein the or each multi-directional drive comprises an omni-directional drive.

Clause 43. The assisted propulsion system of clause 42, wherein the or each multi-directional drive comprises a Mecanum wheel.

Clause 44. The assisted propulsion system of clause 40 or 41, wherein each multi-directional drive comprises a Mecanum wheel having a midplane of rotation non-parallel to the centre axis of the assisted propulsion system.

Clause 45. The assisted propulsion system of clause 44, wherein one of said multi-directional drives comprises a Mecanum wheel having a midplane of rotation at 45° to the centre axis and the other one of said multi-directional drives comprises a Mecanum wheel having a midplane of rotation at 135° to the centre axis.

Clause 46. The assisted propulsion system of clause 42, wherein the or each omni-directional drive comprises:

a substantially spherical wheel arranged to contact the surface at a point substantially in a first hemisphere; and, three or more rotatable elements disposed about a second hemisphere opposite the first hemisphere and arranged to contact the spherical wheel and rotate with the spherical wheel.

Clause 47. The assisted propulsion system of any of clauses 28 to 46, wherein the driving part is substantially fixedly connected to the mount to transmit forces from the driving part to the mount in all directions except towards or away from the surface whereby said decoupling is configured to cause the driving part to move under the resilient spring force to substantially absorb forces directions substantially towards or away from the surface.

Clause 48. The assisted propulsion system of clause 47, wherein the mount includes resiliently sprung link to provide the resilient spring force, the resiliently sprung link comprising one or more of a gas spring, a compression spring, a tension spring, an actively controlled pressure compressed air cylinder.

Clause 49. The assisted propulsion system of any of clauses 29 to 32, further comprising a further element arranged to move across the surface with the driving part, the processor being further configured to execute computer program code to determine acceleration properties of the element and to determine hardness properties of the surface in dependence on the determined acceleration.

Clause 50. The assisted propulsion system of clause 49, wherein the element includes a non-uniformity which passes over the surface as the element moves across the surface.

Other embodiments will be apparent to the skilled person having regard for the teachings herein and the claims which follow.

The invention claimed is:

1. A chassis for conveying a payload along a surface comprising:
   a plurality of wheels disposed about the chassis for supporting the chassis on the surface;
   a drive arranged to provide at least assisted propulsion to the chassis along the surface;
   at least one sensor arranged to monitor operation of the drive; and
   a controller arranged to determine one or more properties of the surface from data from the sensor on operation of the drive and to control operation of the drive in dependence on said determined one or more properties,
   wherein the at least one sensor is configured to monitor a rotational speed of the drive and the controller is configured to control operation of the drive based on a change in rotational data received from the at least one sensor.

2. The chassis of claim 1, wherein the drive includes a driving part, wherein at least the driving part of the drive is connected to the chassis via a mount having a resiliently sprung link, wherein at least the driving part of the drive has a fixed orientation and is moveable independently of the chassis and the plurality of wheels in a direction towards the surface, wherein the resiliently sprung link is arranged to direct at least the driving part of the drive onto the surface during provision of said assisted propulsion.

3. The chassis of claim 2, wherein the drive includes an element that moves across the surface as the driving part propels the chassis along the surface and causes a change in said acceleration of the drive in dependence on hardness properties of the surface, wherein the at least one sensor is arranged to monitor operation of the element, and the controller executes computer program code to determine the acceleration caused by the element and to determine hardness properties of the surface in dependence on the determined acceleration caused by the element.

4. The chassis of claim 2, wherein the drive includes an element that is separate to the driving part and moves across the surface as the driving part propels the chassis along the surface, wherein the element undergoes a change in acceleration in dependence on hardness properties of the surface, and the at least one sensor is arranged to monitor operation of the element, and the controller executes computer program code to determine the acceleration caused by the element and to determine hardness properties of the surface in dependence on the determined acceleration of the element.

5. The chassis of claim 2, wherein the mount is arranged to transmit forces from the driving part to the chassis in all directions except substantially towards or away from the surface, and the resiliently sprung link is arranged to apply a damping effect to forces from the driving part in said direction substantially towards or away from the surface.

6. The chassis of claim 5, wherein the resiliently sprung link comprises one or more components selected from the group consisting of a gas spring, a compression spring, a tension spring, and an actively controlled pressure compressed air cylinder.

7. The chassis of claim 1, wherein the at least one sensor includes one or more of an accelerometer, a MEMS accelerometer, a strain gauge element, an optical sensor, an electrical sensor, a system monitoring a motor powering the multi-directional drive, and a displacement detector.

8. The chassis of claim 1, wherein the controller is arranged to receive a control input from an operator of the chassis and is arranged to control operation of the drive in dependence on the control input and on the data received from the at least one sensor.

9. The chassis of claim 8, wherein the controller is arranged to determine a change to the velocity, or to the acceleration, or to both the velocity and the acceleration, of the drive from the control input and is arranged to determine a magnitude of said change in dependence on the control input and the data received from the at least one sensor.

10. The chassis of claim 1, further comprising a pair of the drives, wherein the pair of drives are spaced apart from each other in a plane substantially parallel to the surface and are independent of each other.

11. A patient handling equipment incorporating the chassis of claim 1 and a mount for coupling the drive, which forms at least a portion of an assisted propulsion system, to the chassis, wherein the mount substantially decouples at least a driving part of the drive from the chassis in a direction substantially perpendicular to the surface and is arranged to apply a resilient spring force to direct at least the driving part of the drive onto the surface during provision of said assisted propulsion.

12. The chassis of claim 1, wherein the one or more properties of the surface is an angle of incline or decline.

13. A chassis for conveying a payload along a surface comprising:
   a plurality of wheels disposed about the chassis for supporting the chassis on the surface;
   a drive coupleable to the chassis via a mount and arranged to provide assisted propulsion to the chassis along the surface, wherein the mount substantially decouples at least a driving part of the drive from the chassis in a direction substantially perpendicular to the surface and is arranged to apply a resilient spring force to direct at least the driving part of the drive onto the surface during provision of said assisted propulsion;
   a controller arranged to control operation of the drive
   a sensor arranged to monitor operation of the drive and to communicate data on said operation to the controller,
   wherein the sensor is configured to monitor at least one of: a rotational speed of the drive, load supported by the chassis, and/or angle of incline or decline of the chassis, and the controller is arranged to control operation of the drive in dependence on a change in data received from the sensor.

14. The chassis of claim 13, wherein the sensor is arranged to monitor acceleration of at least a part of the drive and to communicate data on said acceleration to the controller, and wherein the controller is arranged to control operation of the drive based on the data received from the sensor.

\* \* \* \* \*

UNITED STATES PATENT AND TRADEMARK OFFICE
CERTIFICATE OF CORRECTION

PATENT NO. : 9,937,943 B2
APPLICATION NO. : 14/900045
DATED : April 10, 2018
INVENTOR(S) : Richard Nilsson et al.

It is certified that error appears in the above-identified patent and that said Letters Patent is hereby corrected as shown below:

On the Title Page

Column 2, OTHER PUBLICATIONS, Line 3, after "2014" insert -- (P4341-WO) --

In the Specification

Column 1, Line 6, delete "May 12, 2014," and insert -- May 21, 2014, --

Column 1, Line 6, delete "EP 13168602.2" and insert -- EP 13168603.2 --

Signed and Sealed this
Thirteenth Day of November, 2018

Andrei Iancu
*Director of the United States Patent and Trademark Office*